United States Patent
Backfolk et al.

(10) Patent No.: US 11,396,199 B2
(45) Date of Patent: Jul. 26, 2022

(54) INKJET INK RECEPTIVE COATING COMPRISING ESTERIFIED OR ETHERIFIED STARCH AND LAPONITE

(71) Applicant: STORA ENSO OYJ, Helsinki (FI)

(72) Inventors: Kaj Backfolk, Lappeenranta (FI); Katriina Mielonen, Lappeenranta (FI); Sami Ovaska, Lappeenranta (FI)

(73) Assignee: Stora Enso OYJ, Helsinki (FI)

( * ) Notice: Subject to any disclaimer, the term of this patent is extended or adjusted under 35 U.S.C. 154(b) by 27 days.

(21) Appl. No.: 15/560,242

(22) PCT Filed: Mar. 23, 2016

(86) PCT No.: PCT/IB2016/051648
§ 371 (c)(1),
(2) Date: Sep. 21, 2017

(87) PCT Pub. No.: WO2016/151511
PCT Pub. Date: Sep. 29, 2016

(65) Prior Publication Data
US 2018/0056695 A1    Mar. 1, 2018

Related U.S. Application Data

(60) Provisional application No. 62/136,874, filed on Mar. 23, 2015.

(51) Int. Cl.
*C09D 1/00* (2006.01)
*B05D 5/04* (2006.01)
(Continued)

(52) U.S. Cl.
CPC ............ *B41M 5/52* (2013.01); *B05D 5/04* (2013.01); *B05D 5/06* (2013.01); *B32B 29/00* (2013.01);
(Continued)

(58) Field of Classification Search
CPC ...... B41M 5/52; B41M 5/508; B41M 5/5218; B41M 5/5236
See application file for complete search history.

(56) References Cited

U.S. PATENT DOCUMENTS 4,154,899 A    5/1979   Hershey et al.
4,542,059 A *  9/1985   Toganoh ............. B41M 5/5218
                                                    347/105
(Continued)

FOREIGN PATENT DOCUMENTS

DE    19706574 A1   8/1998
EP    0732218 A1    9/1996
(Continued)

OTHER PUBLICATIONS

Mielonen, K. et al. "Potential of Coating Comprising Hydroxypropylated Starch for Dye-Based Inkjet Printing", NIP & Digital Fabrication Conference, 2015, pp. 462-466.
(Continued)

*Primary Examiner* — Francisco W Tschen
(74) *Attorney, Agent, or Firm* — Greer, Burns & Crain, Ltd.

(57) ABSTRACT

A method of manufacturing a paper or paperboard with improved printing properties, which method comprises the steps of, providing a paper or paperboard substrate, comprising cellulosic fibres, providing a coating composition comprising a mixture of an esterified or etherified starch and a inorganic mineral; and coating at least one surface of said substrate with at least one layer of said coating composition.

9 Claims, 2 Drawing Sheets

(51) Int. Cl.
*B05D 5/06* (2006.01)
*D21H 19/00* (2006.01)
*B41M 5/52* (2006.01)
*D21H 27/10* (2006.01)
*D21H 19/40* (2006.01)
*D21H 19/54* (2006.01)
*B41M 5/50* (2006.01)
*B32B 29/00* (2006.01)
*D21H 17/68* (2006.01)
*D21H 17/28* (2006.01)
*B41M 5/00* (2006.01)
*C09D 7/61* (2018.01)
*C09D 103/08* (2006.01)
*D21H 19/82* (2006.01)
*D21H 19/84* (2006.01)
*D21H 19/80* (2006.01)
*C08K 3/34* (2006.01)

(52) U.S. Cl.
CPC .......... *B41M 5/0017* (2013.01); *B41M 5/508* (2013.01); *C09D 1/00* (2013.01); *C09D 7/61* (2018.01); *C09D 103/08* (2013.01); *D21H 17/28* (2013.01); *D21H 17/68* (2013.01); *D21H 19/40* (2013.01); *D21H 19/54* (2013.01); *D21H 19/822* (2013.01); *D21H 19/84* (2013.01); *D21H 27/10* (2013.01); *B41M 5/5218* (2013.01); *B41M 5/5236* (2013.01); *C08K 3/346* (2013.01); *D21H 19/80* (2013.01)

(56) References Cited

U.S. PATENT DOCUMENTS

| | | | |
|---|---|---|---|
| 5,916,420 | A | 6/1999 | Wurster et al. |
| 6,447,114 | B1* | 9/2002 | Sunderrajan ............ B41M 5/502 347/105 |
| 2002/0039639 | A1* | 4/2002 | Kondo ...................... B41M 5/52 428/32.1 |
| 2002/0051865 | A1* | 5/2002 | Hasegawa ............ B41M 5/0035 428/141 |
| 2004/0034144 | A1* | 2/2004 | Scharfe ................... B41M 5/52 524/442 |
| 2004/0197496 | A1 | 10/2004 | Song et al. |
| 2009/0311515 | A1* | 12/2009 | Gunzel ................ B41M 5/0035 428/326 |
| 2010/0163915 | A1 | 7/2010 | Herrmann et al. |
| 2012/0081809 | A1 | 4/2012 | Tung et al. |

FOREIGN PATENT DOCUMENTS

| | | |
|---|---|---|
| EP | 0767273 A1 | 4/1997 |
| EP | 0811719 A1 | 12/1997 |
| EP | 0909851 A1 | 4/1999 |
| EP | 1658993 A1 | 5/2006 |
| GB | 944804 | 12/1963 |
| JP | 06158596 H | 6/1994 |
| JP | H09501745 A | 2/1997 |
| JP | H1060799 A | 3/1998 |
| JP | 2005096434 A | 4/2005 |
| WO | 9505505 | 2/1995 |
| WO | 2005115763 A1 | 12/2005 |
| WO | 2015012809 A1 | 1/2015 |

OTHER PUBLICATIONS

International Search Report for PCT/IB2016/051648, dated Jun. 16, 2016.

Mielonen, Katriina, et al., Potential of Coating Comprising Hydroxypropylated Starch for Dye-Based Injet Printing, 2015 Society for Imaging Science and Technology, NIP31, 31st International Conference on Digital Printing Technologies, pp. 462-466.

Jing Gao, et al., Determination of Ink Flowability, New printing ink Knowledge Manual, Beijing: Printing Industry Press, Jan. 1994, pp. 163-165.

Mingda Dong, et al., Ink Absorbency and Print Quality, Printability of Paper Ink, Beijing: Printing Industry Press, Jun. 1988, p. 76.

Translation of Chinese Office Action from corresponding Chinese application No. CN201680015444 dated Jun. 26, 2020.

* cited by examiner

INKJET INK RECEPTIVE COATING COMPRISING ESTERIFIED OR ETHERIFIED STARCH AND LAPONITE

This application is a U.S. National Stage under 35 U.S.C. § 371 of International Application No. PCT/IB2016/051648 filed Mar. 23, 2016, which claims priority to U.S. Patent Application No. 62/136,874 filed Mar. 23, 2015.

TECHNICAL FIELD

The present document relates to a method of manufacturing a paper or paperboard with improved printing properties coating a paper or More particularly, the present disclosure relates to a method of providing a paper or paperboard with a receptive coating comprising an esterified or etherified starch and an inorganic mineral.

BACKGROUND

The use of coated or barrier coated packaging boards and/or papers in inkjet printing utilizing water based inks is usually challenging due to high tendency to ink bleeding or feathering. The high bleeding behavior is usually associated with the density of the surface or unfavourable surface chemistry, which then leads to uncontrolled ink spreading. Paper with low porosity or capillarity or low ability to rapidly absorb inks or ink carrier media, leads thus to poor print quality.

By surface sizing or pigmentation the substrate, it is possible to improve print quality. This, on the hand, will not always provide sufficient print density for dye based inks.

By mineral or polymer coating, it is possible to create microstructure or a surface with higher absorption capacity. The use of silica or high surface area pigments, will for example, create fast ink solvent absorption and hence good print density. The gloss in such cases is usually very limited or poor. A high gloss print can be obtained by using resin coatings, while the main drawbacks of these are the reduced ink drying time and hence problem with smearing and bleeding.

Thus, many types of coatings will reduce the microporosity of the surface and thus reduce solvent absorption rate and hence enhance lateral spreading of ink and thus risk for ink bleeding or ink wicking.

There is thus a need to find a dispersion coating that provide rapid ink jet ink setting time (good ink fixation without smearing or causing ink bleed or wicking) and that provide high print density preferably with high print gloss.

It is also preferable that the solution is scalable and compatible with other printing techniques such as offset or flexography or liquid or dry toner, respectively.

SUMMARY

It is an object of the present disclosure, to provide an improved receptive coating suitable for ink jet, which eliminates or alleviates at least some of the disadvantages of the prior art receptive coatings for ink jet printing.

The invention is defined by the appended independent claims. Embodiments are set forth in the appended dependent claims and in the following description and drawings.

According to a first aspect, there is provided a method of manufacturing a paper or paperboard with improved printing properties, which method comprises the steps of; providing a paper or paperboard substrate, comprising cellulosic fibres, providing a coating composition comprising a mixture of an esterified or etherified starch and an inorganic mineral; and coating at least one surface of said substrate with at least one layer of said coating composition.

By providing the paper or paper board with the coating composition comprising an esterified or etherified starch, as a binder, and a inorganic mineral, as a pigment, there is provided a way of providing the paper or paperboard with a receptive coating, which is particularly suitable for e.g. ink jet printing applications, giving an improved optical print density, less ink spreading, better ink adhesion and a high print gloss. The receptive coating further allows for the ink to dry more quickly, i.e. a rapid ink jet setting time, than with conventional receptive coatings. The inkjet receptive coating may be particularly useful in printing with water-based inks with dye colorants.

The esterified or etherified starch may be selected from the group consisting of hydroxypropylated starch, hydroxyethyl starch, or combinations or modifications of any of these.

The esterified or etherified starch may be hydroxypropylated starch.

The inorganic mineral may be any one of a silicate mineral and a kaolin clay.

The silicate mineral may be any one of a layered silicate, a synthetic swellable silicate.

An example of a synthetic swellable silicate is Laponite which is a silicic acid and sodium magnesium lithium salt.

The silicate mineral may be a nano-mineral.

The kaolin and synthetic layered silicate may also be called functional nanopigments.

The coating may be applied as a single layer coating or multiple layer coating.

By multiple layer coating is thus meant at least two layers, i.e. double-layer coating and when the coating is applied as multiple layer coating the coating layers may be the same or different.

This means that for instance the coating weight or the proportions of the constituent materials of the coating composition may be the same of different for the different layers. The paper or paperboard may also be provided with other types of coating.

The coat weight of the at least one coating layer may be in the range of 3 to 12 $g/m^2$ or in the range of 5 to 10 $g/m^2$.

Preferably the total coat weight is around 5 g/m2 or 10 $g/m^2$ for all layers.

The proportion of said silicate mineral may be less than 50% (pph) or less than 30% (pph) of the esterified or etherified starch.

According to a second aspect there is provided a packaging or paper product produced according to the method of the first aspect.

The product may be suitable for ink jet printing.

By suitable for ink jet printing is meant that the print quality is high, in that the coated substrates shows excellent print density values and reasonable dry rub but low wet ink adhesion results, which was ascribed to dissolution of the coating-ink interface.

According to a third aspect there is provided the use of a packaging or a paper product according to the second aspect in ink jet printing applications.

The ink jet printing application may preferably be based on water-based inks with dye colorants.

According to a fourth aspect there is provided a receptive coating composition for a paper or paperboard, wherein the receptive composition comprises a mixture of an esterified or etherified starch and an inorganic mineral.

The esterified or etherified starch is hydroxypropylated starch and wherein the inorganic mineral is a silicate mineral.

The proportion of said silicate mineral is less than 50% (pph) or less than 30% (pph) of the hydroxypropylated starch.

The inventive receptive coating led to substantial improvement in print quality even with a small amount of silicate among hydroxypropylated starch, suggesting that the combination of low-cost starch and silicate additive is an economically feasible approach for producing substrates for water based inkjet inks.

According to a fifth aspect there is provided use of the receptive coating according to the fourth aspect for coating a paper or paperboard.

BRIEF DESCRIPTION OF THE DRAWINGS

Embodiments of the present solution will now be described, by way of example, with reference to the accompanying schematic drawings.

DETAILED DESCRIPTION

Figure 1A:
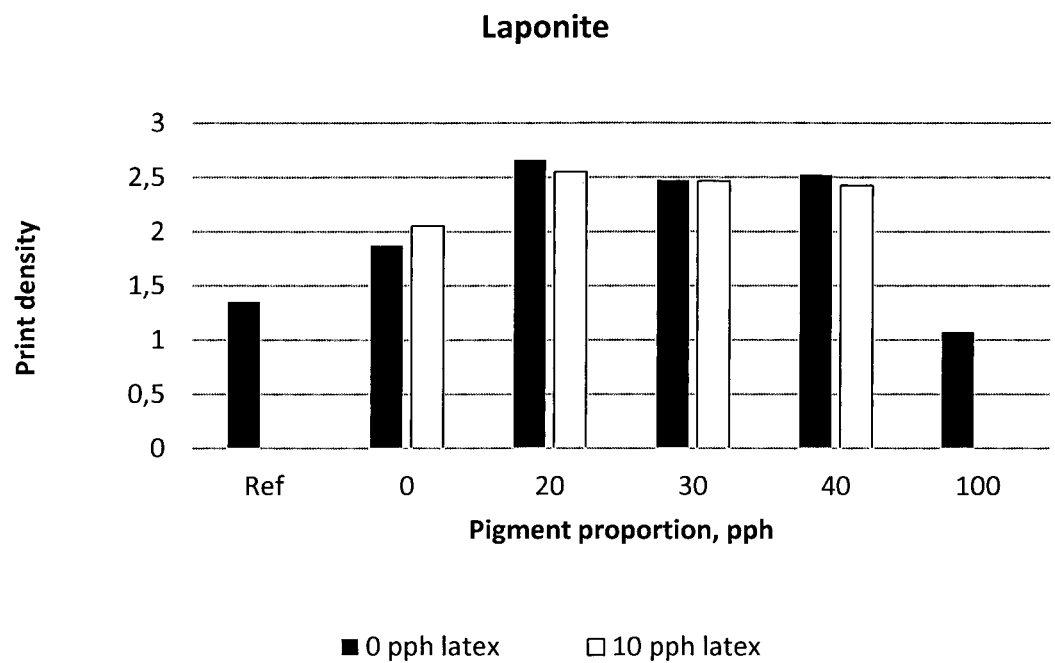
FIG. 1a is a diagram showing print density results for a sample including a synthetic silicate such as a modified Laponite.

In the inventive method a paper or paperboard, i.e. a paper substrate, is provided with a so called receptive coating.

The receptive coating comprises composition or a mixture of an inorganic mineral and an esterfied or etherified starch.

The coating composition is applied on at least one side of the paper substrate. The coating may be performed by any of the conventional coating techniques known in the art.

The coating composition may further be applied as a single layer coating. Alternatively the coating composition may be applied as a multiple layer coating, for instance as a double-layer coating.

The coat weight for each layer may be in the range of 3-12 $g/m^2$, or in the range of 5 to 10 $g/m^2$. In one alternative the coat weight may be around 5 $g/m^2$/layer, or around 10 $g/m^2$/all layers.

The esterfied or etherified starch may be selected from the group consisting of hydroxypropylated starch, hydroxyethyl starch, or combinations or modifications of any of these.

In one alternative the starch may be hydroxypropylated starch. Starch, an abundant and biodegradable raw material widely exploited in the paper industry, has potential to be used as binder in coatings of printing papers but its efficiency alone is often only moderate (Batz-Sohn et al 2009), which has limited its usage in high-quality printing papers. Therefore, the use of starch in coated graphical paper grades for inkjet printing is a relatively unexplored research topic, whereas it is well-known that mineral coatings comprising starch binders are often not suitable for manufacturing high-quality substrates due to poor ink adhesion and slow ink absorption.

The inorganic mineral or pigment may be a kaolin clay.

The inorganic mineral or pigment may preferably be a silicate mineral. The silicate mineral may be any one of a layered silicate, a synthetic swellable silicate. The silicate mineral may further be a nano-mineral.

Synthetic clays such as Laponite are used in several applications as stabilizers, thickeners or film-formers (Anon.). Dissolving of Laponite in water results in a colloidal dispersion of crystals. The face of these crystals has negative charge, whereas positive charges are located in the edge. The charge of the edge is dependent on pH, and becomes neutralized at pH levels >11, indicating that the pH of the dispersion should be kept below this value. The size of Laponite crystals is very small (approx. 25 nm) compared to natural clays such as bentonite. These properties make Laponite also an interesting pigment for the production of high-performance printing papers comprising a multi-component coating (Majumdar et al. 2003).

The inorganic mineral or pigment may be disperesed in an aqeous media.

The nominal compositions of the coatings or dispersions, given as relative amounts of the dry mass may comprise less than 50 pph of pigment (synthetic silicate or kaolin), or even less than 30 pph of pigment.

The paper or paperboard may be used in ink jet printing applications, utilizing water based inks.

Trial

The aim of the trial was to investigate the inkjet printability of dispersion-coated multi-component coatings based on hydroxypropylated starch. The effects of pigment addition, a high aspect ratio kaolin clay and a nanopigment, are discussed. The coatings provided not only high print density and rapid ink setting behavior, but surprisingly also prevented mineral oil migration with certain compositions and showed moderate barrier properties.

Materials

Dispersed synthetic silicate (Laponite RDS), i.e. a silicate mineral, and a high aspect ratio kaolin was used in combination with cooked potato-based, low-viscous hydroxypropylated starch with and without the addition of styrene-butadiene latex with a glass transition temperature of −9° C. The mean particle size of the latex was measured with a Malvern Zetasizer Nano ZS instrument (Malvern Instruments Ltd.) to 160 nm. A4 SBS paperboard sheets with a grammage of 350 $g/m^2$ were used as substrates.

Pilot Coating

The sheets were double coated in a bent-blade coating mode with a pilot coater. The targeted coat weight was 4 $g/m^2$/layer. Coated sheets were dried with an infrared dryer with a heating power of 6 kW. The drying time was approx. 12 seconds depending on the proportion of pigment in the coating dispersion.

The nominal compositions of the coatings, given as relative amounts of the dry mass, are given in Table 1. The dispersions contained 0-40 pph of pigment (synthetic silicate or kaolin) and were prepared with and without a 10 pph addition of latex. The latex addition was calculated on the basis of the total dry matter content of the other components. The dispersions were prepared by first mixing the latex and the pigment together. The resulting blend was then poured into starch solution using continuous mixing. The dry solids content of the dispersions was adjusted to 16.5 wt-% with tap water and the final pH of the resulting dispersion was measured.

TABLE 1

Composition of the coating dispersions. Pigments used in coating were synthetic silicate (SS) or kaolin (K).

| Test point | Starch (St), [pph] | Pigment, [pph] | Latex (L), [pph] | pH (SS) | pH (K) |
|---|---|---|---|---|---|
| 1 | 100 | 0 | 0 | 5.9 | 5.9 |
| 2 | 100 | 0 | 10 | 7.3 | 7.3 |
| 3 | 95 | 5 | 0 | 7.3 | 6.1 |
| 4 | 95 | 5 | 10 | 7.7 | 6.8 |
| 5 | 90 | 10 | 0 | 8.1 | 6.2 |
| 6 | 90 | 10 | 10 | 8.3 | 6.9 |
| 7 | 85 | 15 | 0 | 8.6 | 6.1 |
| 8 | 85 | 15 | 10 | 8.6 | 6.7 |
| 9 | 80 | 20 | 0 | 8.9 | 6.1 |
| 10 | 80 | 20 | 10 | 8.8 | 7.0 |
| 11 | 70 | 30 | 0 | 9.2 | 6.2 |
| 12 | 70 | 30 | 10 | 9.1 | 7.1 |
| 13 | 60 | 40 | 0 | 9.3 | 6.3 |
| 14 | 60 | 40 | 10 | 9.1 | 7.2 |

Evaluation of Substrate Runnability in Printing Process

The runnability of experimental materials was evaluated by determining water vapor sorption of coating components and the effect of moisture variation on substrate thickness. Due to high thickness and rigidity of the baseboard, it was assumed that cockling and curling are only minor problems, whereas the thickness of the coated substrate may vary significantly as a function of moisture content.

The water vapor sorption characteristics of the coating components were determined using dynamic vapor sorption instrument (DVS). Prior to the measurement, each coating material was equilibrated in a vacuum desiccator filled with phosphorus pentoxide at RH 0%. The sample size was 8 mg. During measurement, the RH was increased from 0% to 90% in 10% steps. Two parallel measurements were performed at 25° C.

Effect of moisture variation on the thickness of the experimental substrates was determined at RH 0% (vacuum desiccator filled with silica gel), RH 50% (constant climate room), and RH 75% (humidity chamber). Thickness was determined after 24 h conditioning from five different locations using a micrometer with 0.001 mm accuracy.

Migration of Gas Phase and Liquid Mineral Oil

The mineral oil migration rate in the gas phase through the coated paperboard samples was measured according to descriptions given by [Gaudreault et al. 2013] and [O'Neill et al. 2012] as a gravimetric measurement using heptane as a simulant. The initial amount of heptane in the measurement dishes was 8 ml. The measurement dishes were circular aluminum dishes typically used in water vapor transmission rate determination. The coated side of the paperboard samples was assembled towards the inside. The dishes were weighed at 0, 1, 3, 5, and 24 h to determine the decrease in weight as heptane vapors migrate through the coated sample. Ambient temperature and RH were monitored during the measurements. The ambient conditions during the measurements varied between 21-22° C. and 35-58% RH. Heptane vapor transmission rate (HVTR) was calculated by using Equation 1:

$$HVTR\left(\frac{g}{m^2 \cdot day}\right) = \frac{\Delta m}{A \times \Delta t} \quad (1)$$

where $\Delta m$ is the change in mass, A is the surface area of the dish opening (0.003167 $m^2$), and $\Delta t$ is the change in time.

The transport of liquid mineral oil through the coatings was qualitatively studied using Attenuated Total Reflectance Fourier Transform Infrared Spectroscopy (ATR-FTIR) with a Spectrometer similarly to the procedure described by [O'Neill et al. 2012]. The diameter of the measuring head was 5 mm.

The transmittance of the plain coating materials and the top side of the coated paperboard samples was measured in the wavelength range 0-4000 $cm^{-1}$. Latex was measured as an aqueous dispersion, while the dry coating materials were measured as powders. The functionality of the paperboard as a barrier against liquid mineral oil migration was tested by placing a drop of mineral oil on the uncoated side and recording the transmittance from the coated side as a function of time. Three parallel measurements were performed for all of the samples. The drop size for the mineral oil was typically 20 µl, and it spread over an area of approximately 5-7 $cm^2$ in the paperboard. The transmittance was recorded at 0, 1, 2, 3, 5, 24, 30, 48, 54 and 72 h after placing the drop on the surface.

Barrier Properties

Water vapor transmission rate (WVTR) of the experimental substrates was measured according to ASTM E 96/E 96M-13, first at RH 55% and then at RH 77%. Prior to measurement, the samples were stored in standard conditions (23° C.; RH 50%) for at least 48 h. The paperboards were attached to the measurement dishes the coated side on top (toward the higher RH). The samples were weighed five times with 7-17 hours between the weighing. This WVTR method is typically used to measure thinner (20-150 µm) film materials. The use of the layered Al-foil and paperboard reference ensured that the thickness of the base paperboard did not influence the reliability of the results.

Oil and grease resistance (OGR) of the coated side was determined using palm kernel oil dyed with Sudan red in accordance with ISO/DIS 16532-1 at 60° C. with an exemption that only five parallel samples was tested. The volume of pipetted oil was 200 µl.

Ink-Substrate Interaction and Atomic Force Microscopy (AFM)

Ink-substrate interaction was investigated with contact angle measurements. Dynamic and static contact angle measurements were performed on the surface treated samples (Attension Theta optical tensiometer) for distilled water ($\gamma$=72.8 mN/m), for 99% diionomethane $CH_2I_2$ (DIM $\gamma$=50.8 mN/m), for 99.8% ethylene glycol 1,2-ethanediol (EG $\gamma$=48.0 mN/m) and for dye-based ink (Memjet M101 black ink). A 420 Hz camera was used to capture images of the drop placed on the sample surface. The droplet volume was 3.0 µl for the water, EG and dye-based ink and 1.0 µl for the DIM. Contact angle was recorded immediately after the drop was released from needle and when surface spreading and absorption started. The change of the contact angle was measured from initial contact to 10 seconds or complete wetting.

The surface free energies (SFE, $\gamma$) were calculated using the acid base approach, which allows closer inspection of solid (s) surfaces (Equation 2). The Acid-Base calculation is based on summing the three SFE components, Lifshitz van der Waals (LW), electron-acceptor (+), and electron-donor (−) components, and thus requires a three-equation system, which can be written as [8]:

$$(1+\cos\theta_i)\gamma_{li} = 2(\sqrt{\gamma_{li}^{LW}\gamma_s^{LW}} + \sqrt{\gamma_{li}^+\gamma_s^-} + \sqrt{\gamma_{li}^-\gamma_s^+}) \quad (2)$$

The nano-scale topography and mechanical properties of the polyelectrolyte-surface-treated papers were measured using an atomic force microscope (AFM). All images were captured in the PeakForce QNM mode at a spring constant of k=5 N/m using probes with a tip radius <8 nm. All AFM tests were carried out under ambient conditions (25±3° C., 40±10% RH). The resolution of the images was typically 512×512 pixels and the scanning rate was between 0.1 and 0.3 Hz. Nanoscope Analysis 1.50 software was used to analyze images and RMS roughnesses. Changes in structure of the surface visible to the naked eye were confirmed in an optical microscope and further surface topography measurements were carried out with nano-scale resolution.

Printing and Print Quality Measurements

Coated samples were conditioned at 23° C. and 50% RH before being printed on a Lomond Evojet Memjet printer that use dye-based CMYK-inks. The printed samples were studied with respect to print density (100% C, 100% M, 100% Y, and 100% K), mottling (100% C, 100% M, 100% Y and 100% K), bleeding and wicking. Print density that is a measure of a contrast between the printing ink and the substrate (10 parallel measurements) was measured with an X-rite SpectroEye spectrophotometer. Mottling, bleeding and wicking (1-4 parallel measurements for each) were determined with an Intelli IAS program with an Epson Expression 1680 scanner, based on the ISO/IEC 13660:2001 standard. Mottling was determined for the black prints (100% areas), wicking was measured from the raggedness of the black and red printed lines on the base paper, and bleeding was measured from the raggedness of the black and red lines printed on white with a yellow boundary.

Dry and Wet Ink Adhesion of Ink

The wet adhesion of the ink was measured according to the water fastness test (Rahman, 2003), using a beaker with deionized water (water equilibrated for at least 5 min). The printed sheet was placed in the beaker for one minute and then removed and dried at room temperature. The optical densities of the black printed area before and after immersion were determined with respect to the original white area adjacent to the printed area. The ratio of the optical density of the water-soaked printed area to that of the unsoaked printed area expressed as a percentage gives the relative water fastness.

Dry and wet rub tests were made on the black and magenta prints with a TMI ink rub tester based on the TAPPI 830 om-04 standard. The rub test was performed on dry sample by rubbing an unprinted sample against a printed sample ten times, whereas the wet rub resistance was performed once on the printed sample after it had been wetted by six drops of water placed on the printed sample. The weight of the test block was 0.9 kg.

Results

Hydroxypropylated starch and synthetic silicate were both found to be hygroscopic materials, and sorption took place even already at RH 10%. However, the sorption isotherms of kaolin (3%) and latex (2%) were very small at the relative humidity range of 0-90%. In fact, latex and kaolin showed water sorption only at relative humidities of ≥70%.

The thickness of the uncoated paperboard increased with increasing relative humidity. At RH 50%, the uncoated sample was already approx. 4% thicker as at RH 0%, and at RH 75% the increase was approx. 7%. However, the moisture uptake made the coated samples thinner, and the greater was the starch content, the thinner the sample became.

Contact angles of liquids and black ink were determined on all the double-coated samples (coat weight 8 g/m$^2$). Contact angle for the water stayed at the same level (approximately 40°) during the measurement for the most of the samples, and no changes of the droplet volume were observed. Small decrease of the contact angles were seen (from 20° to 6° in 5 seconds) when the paper was coated with 100 pph kaolin pigment without latex addition. No changes in the droplet volume occurred suggesting that there were no absorption of the droplet. Contact angle results obtained for the water-based black ink were quite similar with results obtained with water and EG and no effect of pigment proportion was noticed. Contact angle decreased after 0.5 s on the surfaces containing Laponite. After that, contact angle stayed at the same level suggesting that no spreading occurred. Droplet volume did not change during measurements indicating that substantially no absorption occurred which might be associated with the barrier coating behavior of the starch coating. Contact angle of the ink was remarkably higher when coating consisted of plain silicate (100 pph) compared to the kaolin pigment (100 pph) suggestion that spreading in the latter case is more obvious.

With EG, on the other hand, all the samples behaved similar, i.e. contact angle decreased from 60° to 15° in 5 seconds and practically no effect on pigment proportion for the contact angle results were noticed. Contact angle results measured with DIM were also quite similar between the samples. Contact angles stayed at the same level (40°-50°) during the entire measurement and droplet volume stayed stabile suggesting that no absorption or surface spreading occurred.

When latex was used in the coatings, contact angles were higher with all the model liquids (water, EG and DIM) as well as with black ink but droplet behavior during the measurements were still similar compared to latex-free samples.

The effect of starch in the coating can be seen in both Laponite and kaolin pigment containing samples, but the effect of pigment in these coatings is slight. Sample containing 100 pph starch had a water contact angle of 51° after 1 s, and the value remained unchanged for the 5 s test period. Similar behavior was also observed with other probe liquids, EG and DIM. This result indicates that the properties of starch dominated the liquid-substrate interactions as well in the case of composite-type coatings.

Table 2 shows the surface energies of the coatings determined according to Eq 1. Using latex together with pigments resulted in a slightly lower total surface free energy. However, no clear trends were seen in the latex-free test data, though SFE value is remarkably higher when kaolin pigment amount is high (40 pph) in the coating layer.

TABLE 2

Acid/base surface free energy values. On uncoated reference paper SFE value is 37.5 mJ/m2.

| | SFE, mJ/m$^2$ | | | |
| --- | --- | --- | --- | --- |
| | Laponite | | Kaolin pigment | |
| Pigment Proportion | Latex 0 pph | Latex 10 pph | Latex 0 pph | Latex 10 pph |
| 0 | 48.4 | 42.8 | 48.4 | 42.8 |
| 10 | 46.9 | 43.7 | 48.0 | — |
| 20 | 45.3 | 40.5 | 46.9 | 42.0 |
| 30 | 47.4 | 36.2 | 46.3 | 37.8 |
| 40 | 46.8 | 34.2 | 54.2 | 40.9 |

Substrate-ink interaction and print quality was evaluated by means of print density and visual inspection of the double-coated (coat weight 8 g/m$^2$) and printed samples. Print density values for the black ink on the coated papers were measured from the 100% tone area. Results shows that for the reference sample, i.e. 100 pph starch based coating, a print density value approximately 1.8 is obtained while a slight increase is seen when adding 10 pph latex to the formulation. Both these values are significantly higher than obtained from the reference sample (uncoated paperboard), which gave a print density of about 1.3.

Figure 1B:
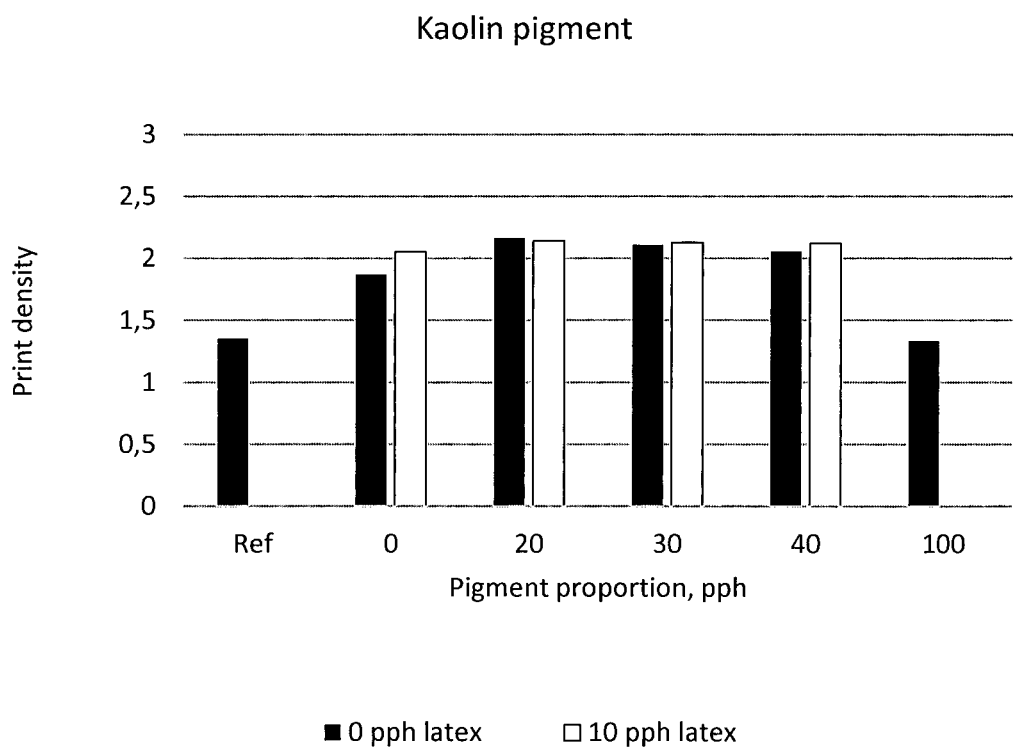
FIG. 1b is a diagram showing print density results for a sample including high aspect ratio mineral such as high AR kaolin.

FIGS. 1a and 1b illustrates the effect of pigment and latex additions on print density of black dye-based ink on 100% tone area.

The research was focused on both single and double-layer coatings, of which the later gave better results. Interestingly, the amount of the double-coated layers were about 10 g/m2, but still gave very encouraging results.

The results shows improved optical print density, less ink spreading, better ink adhesion, and much faster ink drying (less set off).

When comparing the two used pigments, the (nano) silicate improved print quality more than kaolin clay.

The results showed that for the best print quality the optimal kaolin addition is 30 pph at the most, whereas no significant decrease in optical density was observed with a 40 pph silicate proportion. It is also evident that neither starch nor either of the pigments works alone, but it was a question of the joint effect of starch and pigment. Having in mind that such coatings also may provide moderate barrier properties, it is believed that the proposed coating compositions would suit particularly well for e.g. packaging applications.

When the kaolin mineral pigment was used in the coating, the print density values were approximately 0.5 units lower, see FIG. 1b. There was no remarkable effect of latex addition in this case either, thus confirming the above statement. The role of film forming binders such as the latex and HPS used in this case, can obviously be used in selected formulations and with certain inks. The results from Ridgway et al. (2011), for instance, suggested that absorbed or free cationic polymer will be located on the high surface area walls of the fine pores or will migrate to the fine pore regions during the drying process and leading the absorption efficiency due to lost pore volume and lost capillarity.

However, when Laponite was used in the coating, a significant improvement in print density was gained (ca 20%) already at fairly low pigment concentrations. At further addition of the Laponite to the coating layer, the density values remained at the same density level (approximately 2.5 unit), see FIG. 1a. There was no significant effect of latex as a co-binder in the coating layer, which hence imply that the ink absorption and solvent removal is not dominated by capillary suction.

The low ink drop absorption behavior presented above is in fact supporting the high print density values, density values are in line with contact angle results determined with dye-based ink. Contact angle is lower when the coating is made with 100 pph kaolin instead of 100 pph silicate indicating greater tendency to lateral spreading which in turn confirm that density values are lower.

Figure 2:
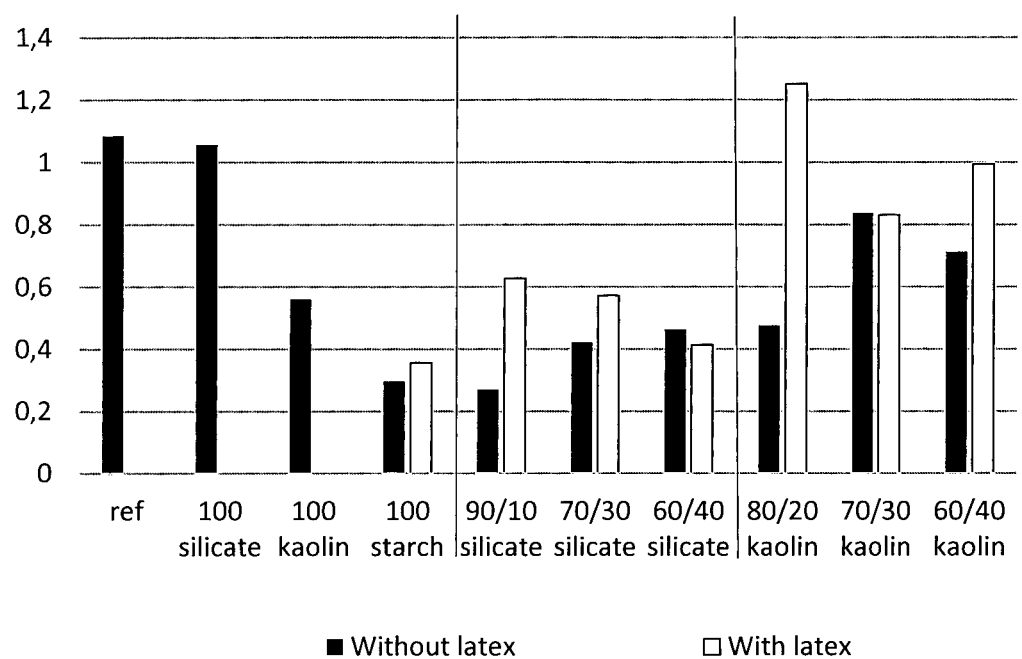
FIG. 2 Mottling for the black prints (100%) on the coated surfaces with and without latex.

Mottling was determined for the black prints (100% areas) on the coated papers and results are presented in FIG. 2. For the silicate-based samples, mottling increased when silicate amount increased suggesting that ink spreads unevenly on the surface that contains more silicate and where the surface roughness is probably lower because of good film forming properties of silicate.

AFM images were captured from the 100% black printed area and AFM imaging of the substrates reveals differences between printed coatings. On uncoated reference, ink seems to be absorbed and structure of fibers can be seen. On starch-based coating black ink seems to cover the full surface and small circles are formed probably when the ink is dried on the surface. Silicate based coating seems to be created a homogenous film on the paper surface. This is probably led to high density and low mottling results which showed that ink is set even on silicate-based coatings.

Dry and wet rub and water fastness were evaluated from the samples. Wet adhesion of the ink was poor for all the samples, but the effect of different coating on dry rub could be seen. Dry rub results were best for the samples with silicate coating, revealing the good ink capturing properties of silica coating.

Barrier Properties and Mineral Oil Migration

All experimental coatings decreased the migration of mineral oil simulant in gas phase (Table 3). The difference between the PET-coated reference sample and the kaolin-free dispersion coatings were relatively small, indicating that HPS-based coatings definitely have potential in preventing mineral oil migration. The results corresponded well with the work of Koivula et al., which showed that HPS-based dispersion coatings reduce the migration of heptane in gas phase (Koivula et al. 2015). However, the functionality of Silicate-based composite coatings is strongly dominated by the properties of HPS. In this study, it was shown that the HVTR increases if synthetic silicate or kaolin is added to the coating dispersion, indicating impaired film coalescence. Interestingly, a small addition of latex weakened the negative influence of pigment, suggesting better barrier properties.

TABLE 3

Mineral oil migration in gas (HVTR) and liquid phases.

| Sample | HVTR, [g/(m$^2$ · 24 h)] | Migration in liquid phase |
|---|---|---|
| Uncoated reference | 1500 ± 25 | Immediate penetration |
| PET-coated reference | 7 ± 5 | No penetration |
| S100 | 17 ± 12 | Immediate penetration |
| S90:SS10 | 30 ± 15 | No penetration |
| S90:SS10:L10 | 15 ± 7 | Immediate penetration |
| S90:K10 | 96 ± 65 | Immediate penetration |
| S90:K10:L10 | 37 ± 15 | Immediate penetration |

The migration of mineral oil in liquid phase was studied with FTIR. Despite of low HVTR values, the migration of liquid mineral oil was generally very rapid through the experimental samples. Penetration took place during the first hour of the test period (72 h) in all cases except the PET-coated reference and starch-silicate blend with a ratio of 9:1. However, this result can be considered very promising since the coat weight was only 8 g/m$^2$. The used synthetic silicate had very good film forming capability, explaining why the substrate was able to prevent the migration of mineral oil in liquid phase. The poor compatibility of HPS and latex may explain why the same coating did not provide barrier for mineral oil if latex was present. In addition, the coatings that contained kaolin were not able to prevent oil to migrate, which is in contradiction with our earlier study (Koivula et al. 2015). The probable cause for this conflict could be differences in the smoothness of the base board and in the coating method, which both have influence on the quality of the coating layer. However, it can be concluded that the migration results presented in this study highlight the potential of HPS-silicate-based coatings for hybrid printing of packaging materials, since such coatings prevent oil originated from e.g. offset printing or recycled fibers to migrate into the package.

The determined WVTR and OGR values for experimental substrates, uncoated reference board and PET-coated reference board are shown in Table 4. As expected, WVTR of all substrates increased with increasing relative humidity, and WVTRs of coated materials were smaller compared to uncoated reference. Surprisingly, adding latex to the coating dispersion increased WVTR, which was ascribed to poorer coalescence of latex-containing coatings due to hydrophobicity of latex and hydrophilicity of HPS. The effect of pigment type had only a minor influence on WVTR, although using kaolin instead of synthetic silicate resulted in slightly lower values. Since HPS was the main component of the experimental coatings, it is evident that its hydrophilicity hinders is usage in barrier coatings if low WVTR is targeted.

All coatings also improved the oil and grease resistance of the substrates, although the penetration times through the experimental coatings were in the range of 1-3 hours. HPS coating provided a grease barrier for three hours, but pigment addition led to faster oil penetration. This drawback, however, can partly be compensated by adding synthetic polymer in the coating dispersion. Due to extensive standard deviation of results presented in this study, making reliable conclusions of the effects of latex or pigment addition on grease resistance is not possible, but similar observations have been reported in earlier literature (Tanninen et al. 2013).

TABLE 4

Water vapor transmission rates at RH 50% and RH 75% and oil and grease resistance at 60° C.

| Sample | WVTR (RH 50%), [g/m2 · 24 h] | WVTR (RH 75%), [g/m2 · 24 h] | OGR, [min] |
|---|---|---|---|
| S100 | 305 | 669 | 180 ± 0 |
| S90:SS10 | 319 | 717 | 71 ± 42 |
| S90:SS10:L10 | 326 | 739 | 83 ± 59 |
| S90:K10 | 255 | 657 | 150 ± 42 |
| S90:K10:L10 | 279 | 663 | 198 ± 78 |
| Uncoated reference | 677 | 1151 | 0 ± 0 |
| PET-coated reference | 22 | 33 | >24 h ± 0 |

A novel hydroxypropylated starch-based composite coatings were developed and their efficiency as a substrate for dye-based inkjet printing was evaluated. It was found that the printability of the substrates evaluated by means of optical density were excellent and improved with increasing addition of synthetic silicate content. The results showed that even a small amount of silicate among hydroxypropylated starch led to substantial improvement in print quality, suggesting that the combination of low-cost starch and silicate additive is an economically feasible approach for producing substrates for water based inkjet inks. Latex addition had a very little impact on the results showed in this paper, suggesting that the co-binder is not a critical component in hydroxypropylated starch-based coatings. Interestingly, also using kaolin pigment instead of silicate provided a significant improvement in print density, but only the presence of silicate resulted in superior printability. The results thus suggest that excellent print quality can be obtained by using hydroxylpropylated starch-based coatings in dye-based inkjet printing, and by re-engineering coating formulation it is possible to develop a low cost substrates for modern inkjet printing technologies.

In view of the above detailed description of the present invention, other modifications and variations will become apparent to those skilled in the art. However, it should be apparent that such other modifications and variations may be effected without departing from the spirit and scope of the invention.

The invention claimed is:

1. A method of manufacturing a paper or paperboard with improved printing properties, which method comprises the steps of;
   providing a paper or paperboard substrate, comprising cellulosic fibres;
   providing a coating composition consisting of a solvent, an esterified or etherified starch, and an inorganic mineral wherein the inorganic mineral comprises Laponite, wherein the esterified or etherified starch is selected from the group consisting of hydroxypropylated starch, hydroxyethyl starch, or combinations or modifications of any of these; and
   forming an ink receptive coating on said substrate by coating at least one surface of said substrate with at least one layer of said coating composition,
   wherein a proportion of said Laponite in said coating composition, relative to the esterified or etherified starch, is less than 50% (pph).

2. The method according to claim 1, wherein the esterified or etherified starch is hydroxypropylated starch.

3. The method according to claim 1, wherein the coating is applied as a single layer coating or multiple layer coating.

4. The method according to claim 3, wherein when the coating is applied as multiple layer coating the coating layers may be the same or different.

5. The method according to claim 1, wherein the coat weight of the at least one coating layer is in the range of 3 to 12 g/m$^2$.

6. A packaging or paper product produced according to the method of claim 1.

7. A packaging or paper product according to claim 6, wherein the product is suitable for ink jet printing.

8. The method according to claim 1, wherein the coat weight of the at least one coating layer is in the range of 5 to 10 g/m$^2$.

9. The method according to claim 1, wherein the proportion of said Laponite is less than 30% (pph) of the esterified or etherified starch.

* * * * *